United States Patent [19]

Asanuma et al.

[11] Patent Number: 4,791,591

[45] Date of Patent: Dec. 13, 1988

[54] APPARATUS FOR CORRECTING SCANNING RATE DEVIATION OF A GALVANOMETER AND CORRECTING METHOD THEREOF

[75] Inventors: Katsumi Asanuma, Ashigara-Kami; Hidetoshi Shinada, Ashigara-Kami, both of Japan

[73] Assignee: Fuji Photo Film Co., Ltd., Kanagawa, Japan

[21] Appl. No.: 797,552

[22] Filed: Nov. 13, 1985

[30] Foreign Application Priority Data

Nov. 13, 1984 [JP] Japan ................... 59-239026

[51] Int. Cl.[4] .................. G01C 25/00; G01D 9/42
[52] U.S. Cl. .................. 364/571.04; 346/108; 350/6.5
[58] Field of Search .......... 364/571, 573, 582; 346/108, 109; 73/1 R; 350/6.5, 6.6, 6.7

[56] References Cited

U.S. PATENT DOCUMENTS

| | | | |
|---|---|---|---|
| 4,213,146 | 7/1980 | Maiman | 350/6.6 |
| 4,272,151 | 6/1981 | Balasubramanian | 346/108 |
| 4,293,202 | 10/1981 | Ohnishi et al. | 346/108 |
| 4,323,906 | 4/1982 | Ohnishi et al. | 346/108 |
| 4,340,894 | 7/1982 | Oono et al. | 346/108 |
| 4,618,940 | 10/1986 | Schmitt | 364/571 |
| 4,630,223 | 12/1986 | Schoon | 346/108 |
| 4,692,884 | 9/1987 | Pryor | 364/573 |

Primary Examiner—Felix D. Gruber
Assistant Examiner—Brian M. Mattson
Attorney, Agent, or Firm—Sughrue, Mion, Zinn, Macpeak, and Seas

[57] ABSTRACT

A method and apparatus for correcting deviation from a constant scanning speed of a galvanometer driven by a linear drive signal, characterized in that the linear drive signal for driving the galvanometer is converted into a non-linear drive signal in accordance with predetermined correction data to thereby reduce the deviation to zero.

7 Claims, 7 Drawing Sheets

FIG. 1
PRIOR ART

FIG_2

FIG_3A
PRIOR ART

FIG_3B
PRIOR ART

FIG_3C

FIG_4

FIG_5A

FIG_5B

FIG_5C

FIG_8

FIG_10

FIG_9A

FIG_9B

FIG_9C

APPARATUS FOR CORRECTING SCANNING RATE DEVIATION OF A GALVANOMETER AND CORRECTING METHOD THEREOF

BACKGROUND OF THE INVENTION

1. Field of the Invention

The present invention relates to a method of correcting scanning rate, or speed of a galvanometer, and to an apparatus for correcting non-linear scanning rate, or speed of the galvanometer that is employed in an optical information recording apparatus, or reading apparatus.

2. Description of the Prior Art

Figure 1:
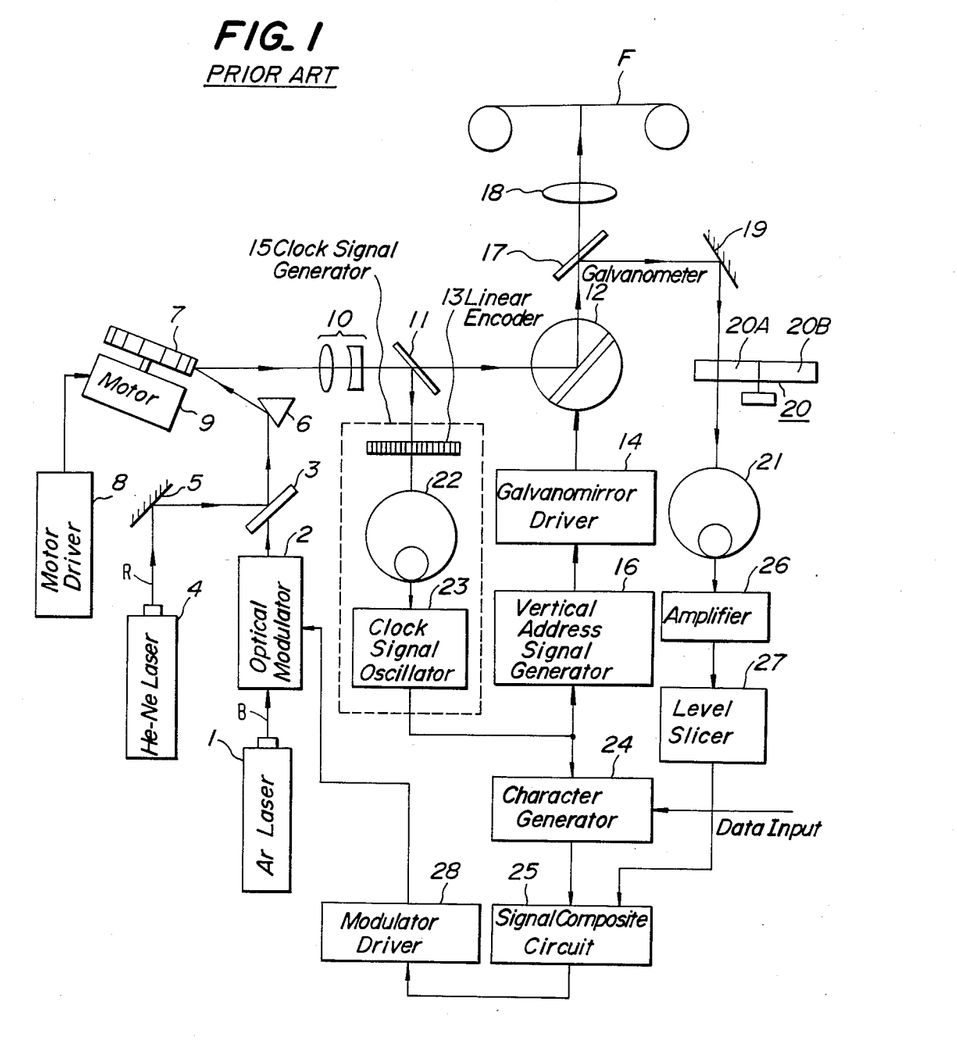
FIG. 1 is an entire block diagram of a computer output microfilm apparatus.

FIG. 1 illustrates a conventional information recording apparatus a computer output microfilm apparatus (referred to as "laser-COM" hereinafter), in which print data (variable information) supplied from the computer and desirable form data (fixed information) are recorded on microforms using a laser beam as scanning light.

With reference to FIG. 1, an argon (Ar) laser 1 emits blue green light beams for recording purposes. The blue green light beams B are intensity-modulated in an optical modulator 2 by video signals (will be discussed later) and thereafter pass through a first dichroic mirror 3. A helium-neon (He - Ne) laser 4 emits red light beams R for reading purposes, which are denoted by "R". The red light beams R are incident upon a first reflecting mirror 5 and reflected therefrom to a first dichroic mirror 3. The red light beams R are reflected from the first dichroic mirror 3 and mixed with the other light beams for recording purposes that have passed through this dichroic mirror 3. The combined light beams are incident on a rotating polyhedric mirror 7 through a second reflecting mirror 6. In this case, the first dichroic mirror 3 is designed to pass the blue and green light beams therethrough and to reflect the red light beams thereon.

The rotating polyhedric mirror 7 is rotated in a predetermined direction at a constant rate by a motor 9 to which power is supplied from a motor drive circuit 8. As a result, the combined light beams R, B incident upon the respective mirror surface of the rotating polyhedric mirror 7 are reflected from these mirror surfaces and simultaneously deflected (referred to as "horizontal-deflected beams"). Then, the mixed light beams are converted into primary scanning light having a repetition period that is defined by the beam reflections occurring from the respective mirror surfaces of the rotating polyhedric mirror 7. The primary scanning light is incident upon a second dichroic mirror 11 via a convergent optical system 10. The second dichroic mirror has such characteristics that the recording blue-green light beams and the reading red light beams can be transmitted therethrough and a part of the reading red light beams can be reflected thereon. Accordingly, in the mixed light beams incident upon the second dichroic mirror 11, both the blue-green light beams B and the red light beams R pass toward a galvanometer 12, and the red light beams R are partially reflected and incident upon a linear encoder 13.

In response to saw-tooth driving signals supplied from a galvanometer driver 14, the galvanometer 12 deflects the recording light beams R, B in a direction substantially perpendicular to the horizontal deflecting direction (referred to as "vertical deflection"). As described above, the galvanometer driver 14 produces the saw-tooth driving signals based upon clock signals derived from a clock signal generator 15 (which will be discussed later). For instance, counting these clock signals in a vertical address signal generator 16 in the vertical deflection period enables the vertical address signals to be produced. In response to these address signals, the galvanometer driver 14 produces the above-described saw-tooth driving signals.

Since the blue green light beams and also the red light beams vertically deflected by the galvanometer 12 have been converted into the one dimensional scanning light by the rotating polyhedric mirror 7, they become two dimensional scanning light by means of such vertical deflections. Then, the two dimensional scanning light as incident upon a third dichroic mirror 17, thereby splitting it into the blue green light and the red light.

The two dimensional scanning light of the blue green light beams passing through the third dichroic mirror 17 is focused on recording materials such as films via a focusing optical system 18 to raster-scan them. The other two dimensional scanning lights of the red light beams split by the third dichroic mirror 17 is incident upon a form slide film 20A via a third reflecting mirror 19.

In a form slide film device 20, a plurality of form slide films 20A, 20B, - - - , 20N are present as needed. Different slide images and writing frames constituted by a plurality of vertical and horizontal lines are recorded on these slide films 20A, 20B, - - - , 20N. For the sake of simplicity, only two form slide films 20A and 20B are illustrated. One of these form slide films is selectively moved to a scanning position where it is scanned by the above two dimensional scanning light. As desired, the form slide films 20A, 20B, - - - , 20N are arbitrarily detachable from the form slide device 20.

As seen from FIG. 1, the two dimensional scanning light R passes through the form slide film 20A and is converted in a first photomultiplier 21 to electric readout signals. The readout signals correspond to video signals of the writing frame image of the scanned form slide film 20A.

The red light beams R split by the second dichroic mirror 11 are, on the other hand, incident upon a linear encoder 13 to be one-dimensional-scanned. The linear encoder 13 is formed by a plurality of transparent and non-transparent line-shaped grids which are aligned parallel to the horizontal deflection direction and equidistantly separated to form a straight striped pattern. Pulsatory light obtained by scanning this linear encoder 13 by means of the horizontal deflection scanning light is converted by a second photomultiplier 22 into pulse signals as clock pulse signals. By applying these clock pulse signals to a phase-coupling type clock signal oscillator 23, clock signals are oscillated. The clock signals are used to synchronize the respective circuit elements of the laser-COM with each other. The linear encoder 13, second photomultiplier 22, and clock signal oscillator 23 constitute the clock signal generating device 15.

Under the timing control of the clock signals derived from the clock signal generating device 15, character information corresponding to coded data from the character information source such as magnetic tapes etc. can be read out from a character generator 24 as video signals. These video signals derived from the character generator 24 are supplied to a signal composite circuit 25. While the form signals that are obtained by amplifying outputs of the first photomultiplier 21 in the amplifier 26 and thereafter shaping them in a level slicer 27 are supplied to the signal composite circuit 25, the above video signals are combined with the form signals in the signal composite circuit 25.

Thus the composite video signals are supplied through a modulator drive circuit 28 to the optical modulator 2 so as to intensity-modulate the recording light beams. As easily seen, the raster-scanned image projected toward the film F corresponds to an image formed from print data derived from the computer and written in a given position of the form frame selected by the form slide film.

Such an information recording apparatus is known from, e.g., U.S. Pat. Nos. 4,323,906 and 4,340,894.

As previously described in detail, the raster scanning in the optical scanning type information recording apparatus is accomplished by the horizontal scanning of the rotating polyhedric mirror 7 and also the vertical scanning of the mirror of the galvanometer 12.

Figure 2:
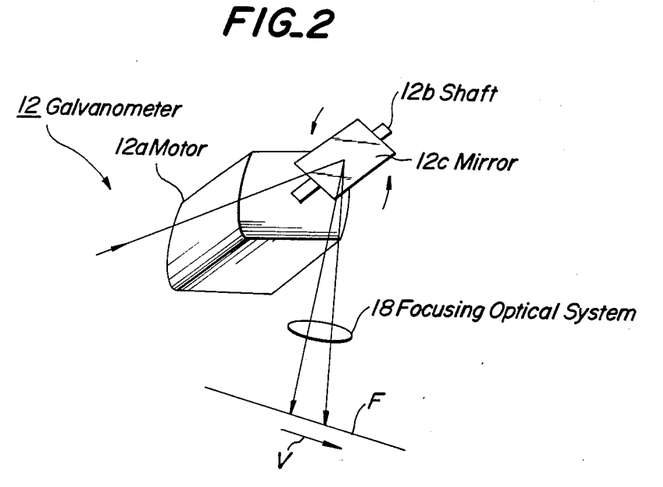
FIG. 2 shows a detailed arrangement of the galvanometer employed in the computer output microfilm apparatus of FIG. 1.

Referring to FIG. 2, the arrangement of the galvanometer 12 will now be described in detail. A mirror 12c mounted on a shaft 12b of a galvanometer motor 12a is repeatedly pivoted within a predetermined rotating angle. The scanning light beam coming from the rotating polyhedric mirror 7 is reflected thereon and simultaneously deflected in the vertical deflection direction as denoted by an arrow V, thereby directing the deflected scanning beam toward the film F. It should be noted that the third dichroic mirror 17 is omitted in FIG. 2.

Figure 3A:
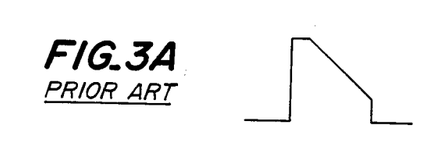
FIGS. 3A to 3C are waveforms of galvanometer drive signals.

The galvanometer 12 is driven by input drive signals which are supplied from the galvanomirror driver 14. The drive signals vary in a linear mode as shown in FIG. 3A. Due to the inherent characteristics of the galvanometer 12, the rotating speed of the motor shaft 12b, i.e., the scanning speed in the vertical deflection direction is not constant, thereby deteriorating the linearity of the galvanometer 12. As a result, the recorded images on the film F are distorted. Such distortions can be reproduced in that the motor 12a of the galvanometer 12 is driven by an input drive signal varying in a non-linear mode as shown by a solid line in FIG. 3B.

Accordingly, the linearity of the galvanometer 12 is improved by the servo system in the galvanometer driver. However, satisfactory results cannot be obtained in the conventional system.

It is therefore understood that considering the non-linear characteristic of the scanning speed of the galvanometer, an amount of deviation between the scanning speed and the desirable constant scanning speed (i.e., linearity) must be corrected.

Specifically as to the point of resolution, when, for instance, the microfilm image having a size of 9 mm × 12 mm is enlarged into a A4-sized image, the desirable resolution of approximately 200 rasters/mm on the microfilm image is required so as to reproduce the resolution of 8 rasters/mm on the enlarged image. Accordingly, since very small distortion is emphasized in the enlarged image in the laser-COM, the linearity of the scanning speed of the galvanometer is a very important factor so that a precisely controlled scanning speed in absolutely required in such a laser-COM.

Figure 3B:
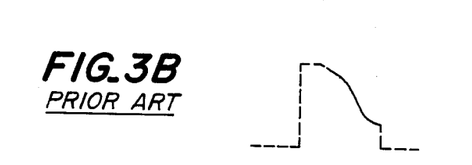
Figure 3C:
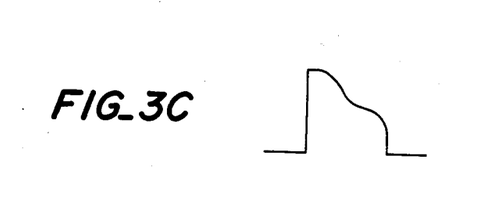

If the input drive signal represents such a non-linear characteristics as shown in FIG. 3B, an input drive signal having another non-linear characteristic opposite to that of FIG. 3B must be used to drive the galvanometer 12 (see FIG. 3C).

An object of the present invention is to provide a method of correcting the non-linear scanning speed of the galvanometer to derive the linear scanning speed.

A further object of the invention is to provide an apparatus for correcting the non-linear scanning speed of the galvanometer.

SUMMARY OF THE INVENTION

These objects of the present invention may be accomplished by providing an apparatus for correcting deviation from a constant scanning speed of a galvanometer driven by a linear drive signal, comprising:

memory means for storing correction data for the linear drive signal and reading out the correction data when an input address signal is supplied thereto; and digital-to-analog converting means for converting the correction data into an analog correction signal, thereby converting the linear drive signal into a non-linear drive signal so as to adjust the amount of deviation to zero.

BRIEF DESCRIPTION OF THE DRAWINGS

The novel features which are believed to be characteristic of this invention, both as to its organization and method of correction, together with further objects and advantages thereof, will be better understood from the following description considered in connection with the accompanying drawings.

DETAILED DESCRIPTION OF PREFERRED EMBODIMENTS

Before proceeding with various embodiments of the invention, basic operation will now be summarized.

At first, when the galvanometer 12 is driven by the linear drive signal, the changed scanning speed thereof is measured. Thereafter, the deviation between the changing scanning speed and the constant scanning speed is detected. Then, the galvanometer is driven by such a non-linear drive signal that will cause the deviation to disappear.

Figure 4:
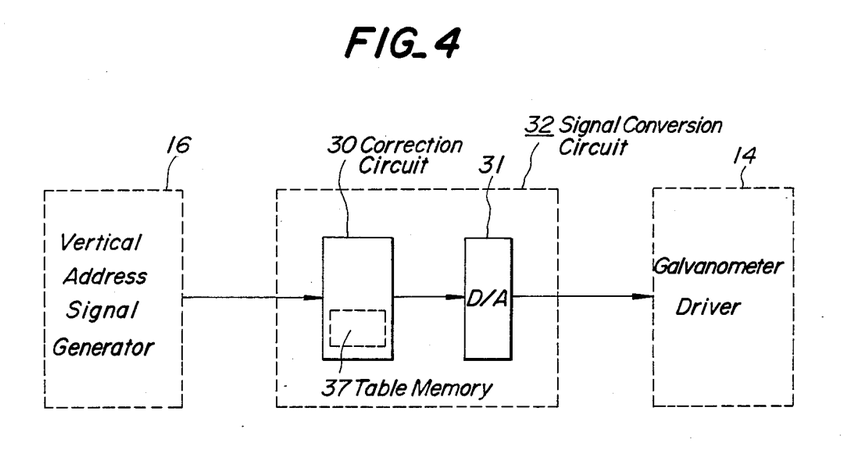
FIG. 4 is a block diagram of a correction circuit and its peripheral circuitry according to a first preferred embodiment.

Referring now to FIG. 4, a system block diagram of one preferred embodiment will be described.

It should be noted that in the following figures illustrating the invention, an omission is made of the circuits not directly related to the invention, such as noise protection circuits, filtering circuits and signal lines.

A signal conversion circuit 32 is interposed between the vertical address signal generator 16 and the galvanometer driver 14. The signal conversion circuit 32 includes a correction circuit 30 and a digital-to-analog converter 31. In the circuit arrangement shown in FIG. 4, when the galvanometer 12 is first driven by the input drive signal whose slope varies linearly with respect to the time lapse, data representing the amount of deviation of the above scanning speed from a predetermined constant scanning speed is read out every time the vertical address signal is produced from the vertical address signal generator 16. This data is processed in the correction circuit 30 of the signal conversion circuit 32. A non-linear signal having an amplitude for compensating for the amount of the above deviation is produced from the correction circuit based upon the read data. Every time the vertical address signal is supplied to the correction circuit 30, a predetermined table value is derived from a table memory 37 in digital form. Thus the table corresponds to the vertical address. This digital table value is used to produce the non-linear drive signal data that can compensate for the deviation. Then, the non-linear drive signal data is digital-to-analog (D/A) converted by the D/A converter 31 into a corresponding non-linear drive signal. As a result, the linear drive signal is converted into the desirable non-linear drive signal by the signal conversion circuit 32.

In practice, in response to the vertical address signals successively derived from the photoelectric pulses of the linear encoder 13 through the clock signal oscillator 23 and the vertical address signal generator 16, digital values corresponding to these vertical addresses are read out from the table memory 37 so as to produce the desirable non-linear drive signal with help of the D/A converter 31 from the signal conversion circuit 32.

In the first embodiment, the table memory 37 is a fixed table memory such as ROM for storing predetermined values. In such a fixed table memory, the above-described deviation of the scanning speed of the galvanometer 12 has been previously read out, and then the correction values corresponding to these deviation amounts are stored for each vertical address.

In the above-described case, there is however a risk that a precise correction may not be realized for the vertical scanning speed if the deviation for each vertical address is changed by the aging effects of the galvanometer. In this case, a variable table memory is suitable to rewrite the table data for each arbitrary vertical address. Accordingly, a memory for storing table data must be, for instance, a random access memory (RAM).

Referring to FIGS. 5A to 5C and FIG. 6, a correction apparatus according to a second embodiment of the invention will now be described in detail, in which the table memory is of a variable table memory.

A principle method for detecting amounts of deviation from a predetermined, constant scanning speed or rate is as follows.

Figures 5A, 5B:
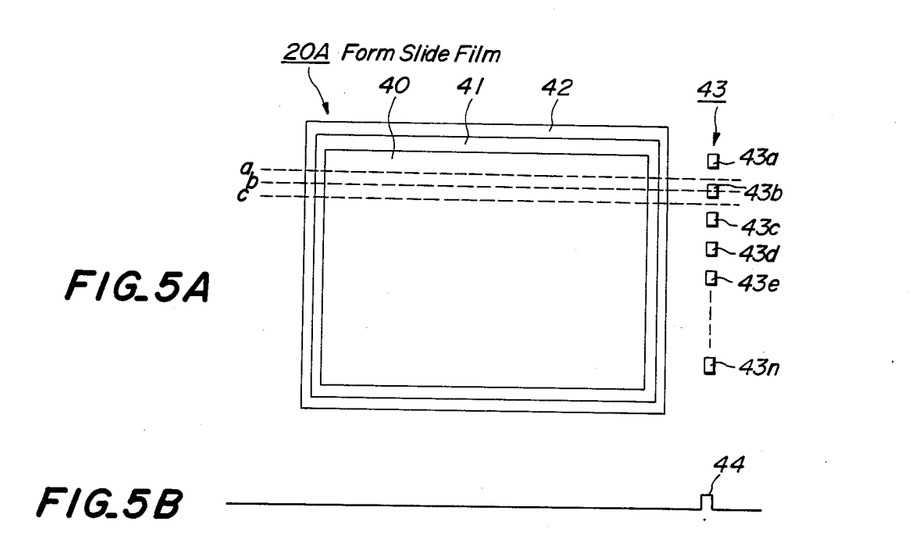
FIGS. 5A to 5C show mainly optical marks and a mark signal of the correction circuit according to the invention.

As seen from the laser-COM shown in FIG. 1, the form slide film 20A has been inserted in the light path of the galvanometer 12. FIG. 5 schematically shows the form slide film 20A. The slide film 20A contains a first recording region 40 where the print data mainly supplied from the computer is to be recorded, a second recording region 41 where the frame data for the form slide film is to be recorded, and a third recording region 42 outside the first and second recording regions 40 and 41, where the image frame such as titles is to be recorded. Optical marks 43 are equidistantly formed at a predetermined scanning period in the vertical deflection direction. These optical marks 43 have the same function as the optical linear encoder.

Figure 5C:
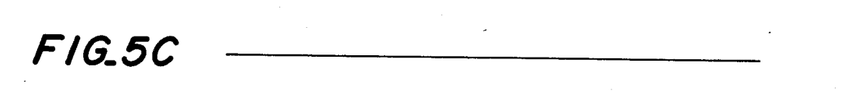
Figure 6:
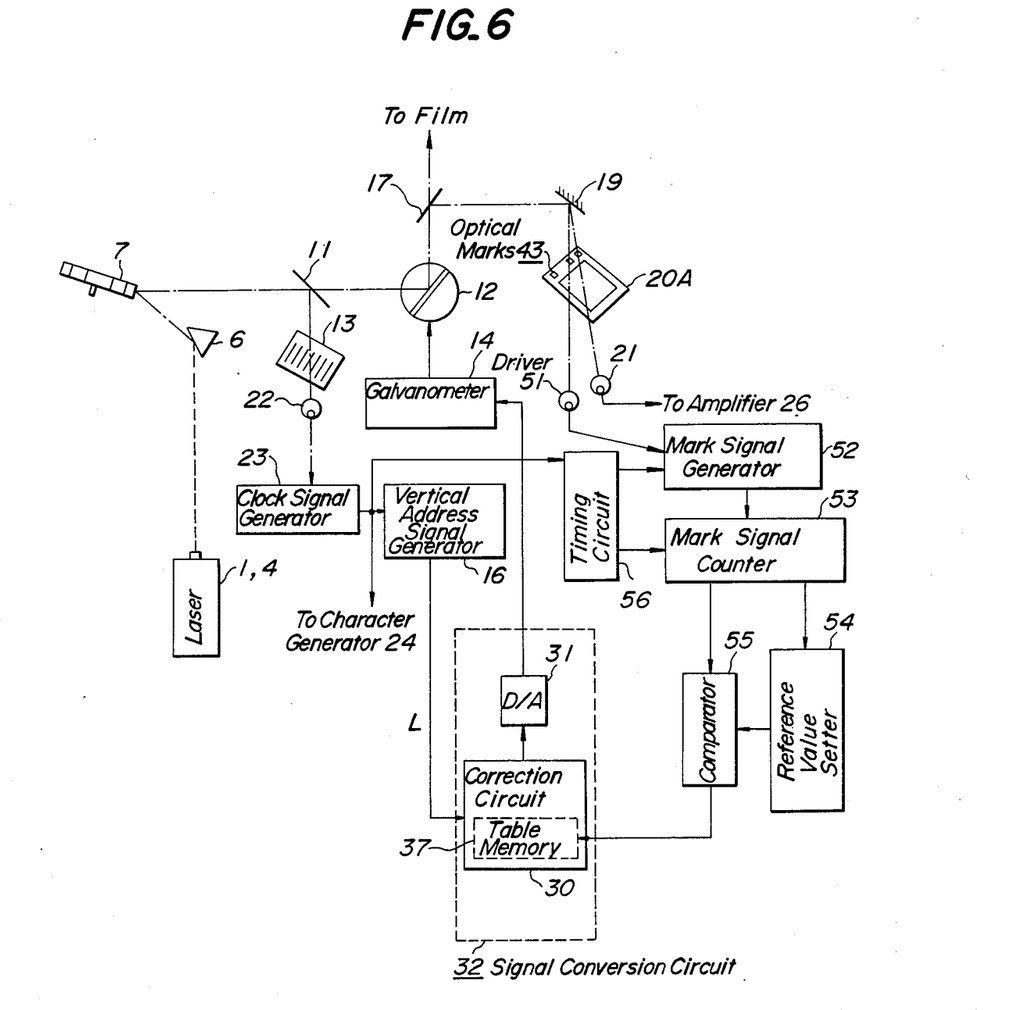
FIG. 6 is a schematic diagram of the signal correction circuit and the peripheral circuitry according to a second embodiment.

Assuming that the optical marks 43 consisting of marks 43a, 43b, ... 43n are formed on the slide film outside the third recording region 42 with a pitch of, for instance, five horizontal scanning lines, mark signals are periodically generated every five horizontal scanning lines by the optical marks 43. If the scanning speed of the galvanometer 12 varies from a predetermined value, the generation of the mark signals cannot be performed at a given periodic cycle. That is, the positional deviation of the scanning can be detected by detecting whether these mark signals are periodically produced every five rasters (horizontal lines). In effect, the presence of the mark signal is determined by only checking timing signals that are precisely predicted by counting the numbers of the clock pulses of the clock pulse generator 23 (see FIG. 6). FIG. 5B shows an input signal 44 for a mark signal counter 53 when the optical marker 43b is scanned by the horizontal line denoted by "b". This input signal 44 corresponds to the mark signal. When the horizontal scanning commences, referring to the system as shown in FIG. 6, the clock signals are generated from the clock signal generator 23 bases upon the pulse signals of the red light beam passing through the linear encoder 13. By counting these clock signals, the horizontal positions of the reading light beam for horizontally scanning the form slide film 20A can be substantially correctly determined, so that the mark signal 44 is counted at the read timing of the optical mark 43. FIG. 5C shows an input signal condition of the mark signal counter 53 when no optical mark is scanned by the horizontal line indicated by "a" or "b" in FIG. 5A. As previously described, if the scanning speed of the galvanometer 12 is constant, the mark signal 44 is produced every five horizontal lines and also the correct repetition of the presence and absence of the mark signal 44 can be periodically effected. That is, a relative relationship exists between the optical mark 43 and the raster, i.e., the horizontal scanning line.

However, when the scanning speed of the vertical deflection of the galvanometer 12 is deviated from a constant value, the above-described relationship cannot be maintained. For instance, although the fifteenth raster must scan the bottommost position of the second mark 43b, it actually scans the position below the bottommost position, resulting no mark signal (see FIG. 5C). Accordingly, the actual raster position is deviated from a predetermined bottommost position of the optical mark 43b in the vertical direction.

According to the correction method of the invention, these mark signals are measured for each of the optical marks 43. In the case of FIG. 5A, five counts are a basic value for the correct scanning speed. If the counting value is smaller than the basic value, i.e., 5, the vertical scanning speed is faster than the predetermined constant speed because the optical mark has been scanned by the rasters less than the basic five rasters. Conversely, if it is greater than five counts, the scanning speed is lower than the predetermined constant speed.

The system shown in FIG. 6 as the second embodiment, utilizes the above-described deviation detection method in that the data stored in the table memory is updated for the scanning speed corrections. It should be noted that the same reference numerals shown in FIG. 1 will be employed as those for denoting the same or similar circuit elements shown in the following figures.

In the system shown in FIG. 6, the form slide film 20A is scanned by the scanning light which is detected in the optical detector 51 for the optical mark 43. The detection signal of the optical detector 51 is supplied to a mark signal generator 52. The mark signal generator 52 is so arranged to generate the mark signal 44 as shown in FIG. 5B when the optical mark 43 is scanned by the raster, and to generate no mark signal as shown in FIG. 5C when the optical mark 43 is scanned. The numbers of the clock signal generator 23 are counted in a timing circuit 56 to precisely measure the correct read timing for the mark signal 40. From the timing circuit 56, the pulse signal is delivered to the mark signal generator 52 only when such a reading timing is detected. In the mark signal counter 53, the mark signal from the mark signal generator 52 is counted for each optical mark 43 only when the pulse signal derived from the timint circuit 56 is added thereto. The resultant counting values of the mark signal counter 53 are supplied to a comparator 55. In synchronism with supplying the counting values from the mark signal counter 53 to the comparator 55, a synchronization signal is fed to a reference value setter 54. Since a predetermined reference number is preset in the reference value setter 54, it is then fed to the comparator 56 in response to the above synchronization signal. As a result, as the measured counting value of the mark signal counter 53 is compared to the reference value of the reference value setter 54 in the comparator 55, a calculated result corresponding to a difference between the measured counting value and the reference value is supplied to the correction circuit 30. On the other hand, the vertical address signal corresponding to the scanning point of the vertical scanning line is supplied from the vertical address signal generator 16 to the correction circuit 30. Then, the data on the table memory corresponding to this vertical address is corrected by the calculated value that is supplied fromm the comparator 55. The corrected value is converted by the D/A converter 31 into a corresponding analog value. The analog correction value is therefore supplied to the galvanometer driver 14 so as to determine the rotation angle of the galvanometer 14. According to the system shown in FIG. 6, the comparator 55 compares and calculates whether the vertical scanning is performed at every optical mark 43 at a given speed, so that the galvanometer 12 can be continuously driven at constant speed because the table data of the correction circuit 30 can be corrected based upon the deviation amount in a case of the shifted scanning speed.

A more detailed description of the correction system will now be made.

The optical marks 43 are formed on the slide film 20 at an equidistant relationship every five horizontal scanning lines the same as in the previous embodiment. The light scanning the form slide film 20A is detected by the optical mark detector 51. The detection signal is then supplied to the mark signal generator 52, while the clock pulses generated from the clock signal generator 23 and the optical linear encoder 13 are supplied to the timing circuit 56. In this timing circuit 56, these clock pulses are counted and a pulse signal is supplied to both the mark signal generator 52 and the mark signal counter 53 only when the position of the optical linear encoder 13 corresponding to the generation of the mark signal is scanned by the horizontal scanning line. The mark signal counter 53 opens its gate to count the mark signal derived from the mark signal generator 52 only when the pulse signal is supplied from the timing circuit 56. Now assuming that the mark signals are continuously counted for times every horizontal scanning, i.e., five times in total after counting the mark signal commences, and that no mark signal is counted during the sixth horizontal scanning. The pulse signal derived from the timing signal 56 is supplied to the mark signal counter 53 as the timing signal for the mark signal reading so that the presence or absence of the mark signal can be detected in the mark signal counter 53. Accordingly, if no mark signal is counted during the sixth horizontal scanning, it can be regarded that a single mark of the optical mark 43 has been scanned. Thus count value, i.e., 5 in this embodiment is sent to the comparator 55 and the mark signal counter 53 resets itself and also supplies the synchronization signal to the reference value setter 54. The mark signal counter 53 waits for the succeeding mark signal to be fed from the mark signal generator 52.

In the reference value setter 54, a reference value, i.e., "5" in this embodiment is preset that corresponds to the number of the horizontal scanning lines for scanning a single opitcal mark 43. When the synchronization signal is supplied from the mark signal counter 53, this reference value of "5" is added to the comparator 55.

As a result, the count value of "5" derived from the mark signal counter 53 is compared to the reference value of "5" derived from the reference value setter 54 in the comparator 55, so that a value corresponding to a difference between these values is supplied to the correction circuit 30. It is obvious that this value is zero because the vertical scanning speed is maintained constant, resulting in no updating the table memory.

When the vertical scanning speed is faster than a predetermined scanning speed, for instance, the count value of "4" per a single optical mark, this value of "4" is supplied to the comparator 55 from the mark signal counter 53. In the meantime, as the preset reference value of "5" is delivered from the reference value setter 54 to this comparator 55, comparison result corresponding to a difference of "1" between the count value and the reference value is supplied to the correction circuit 30. An operational equation for the comparison result may be properly determined by evaluating the drive characteristics of the galvanometer 12.

Since the vertical address is supplied from the vertical address signal generator 16 when the comparison by the comparator 55 is carried out, the data of the table memory corresponding to this vertical address is corrected based upon the comparison result of the comparator 55 and then the corrected digital data is supplied to the D/A converter 31. From the D/A converter 31, the corrected data is supplied as a voltage output determining the rotating angle of the galvanometer 12 to the galvanometer driver 14. As previously described, since the table data of the correction circuit 30 can be corrected based upon the comparison results of the comparator 55, the vertical scanning speed can be precisely corrected even if the deviation changes between vertical addresses.

Figure 7:
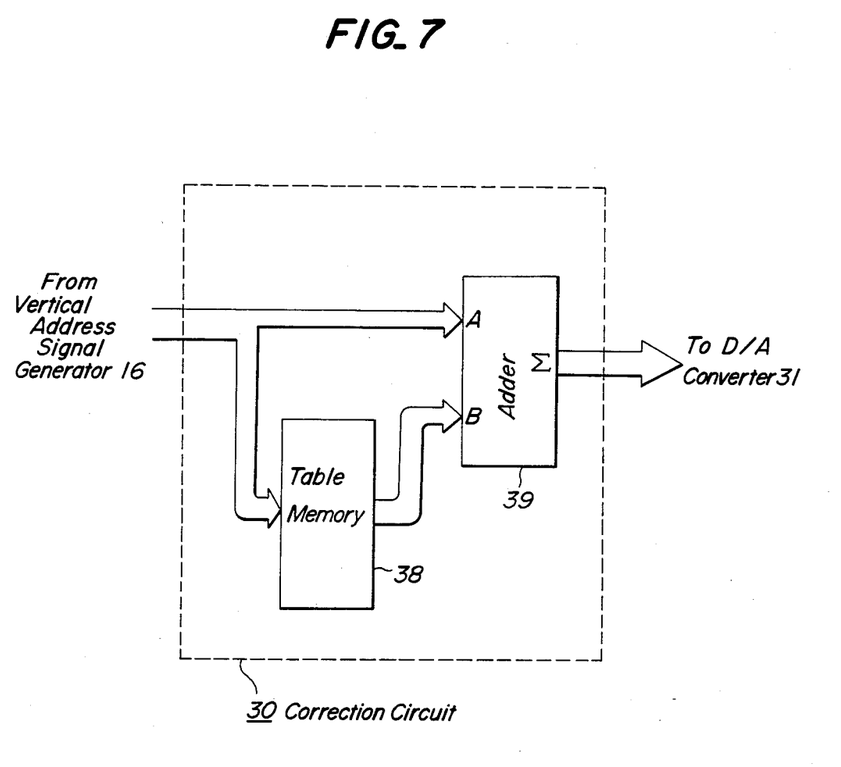
FIG. 7 is a block diagram of an internal circuit of the correction circuit.

In FIG. 7, a detailed circuit diagram of the correction circuit 30 will now be described. The correction circuit 30 includes a table memory 38 and an adder 39. This table memory 38 may be constituted by e.g., RAM, or EPROM. The vertical address signal is supplied to the table memory 38 and also to one terminal "A" of the adder 39. The output of the table memory 38 is supplied to the other terminal "B" of the adder 39. The output adder 39 is delivered to the D/A converter 31.

Figure 8:
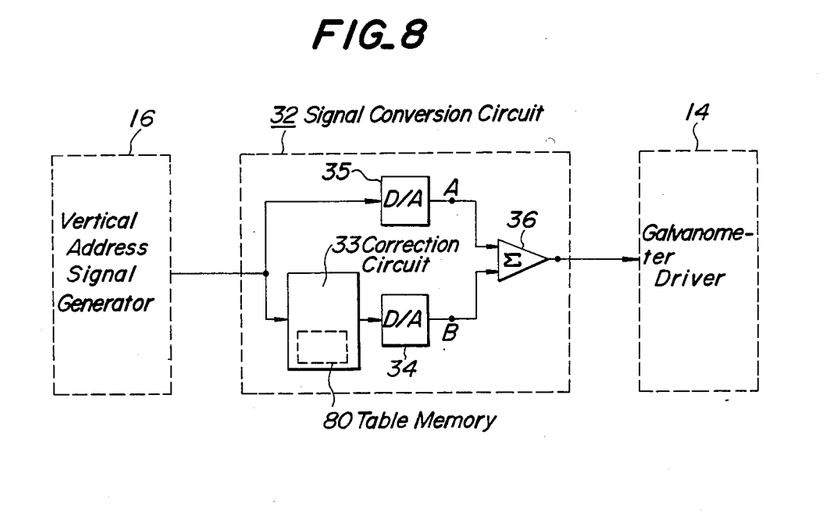
FIG. 8 is a block diagram of a signal conversion circuit according to a third embodiment.
Figure 9A:
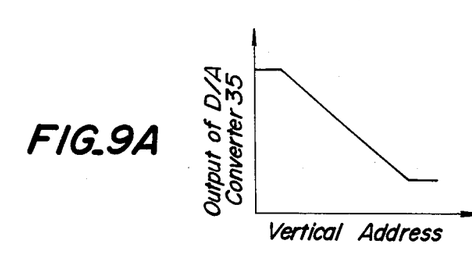
FIGS. 9A to 9C show outputs of the D/A converters and adder shown in FIG. 8.
Figure 9B:
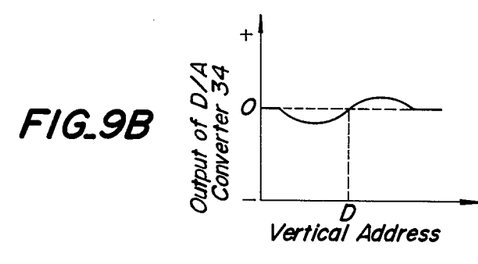
Figure 9C:
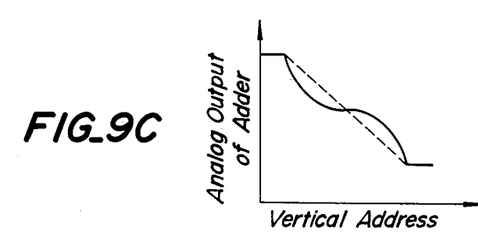

Referring now to FIGS. 8 and 9, a correction circuit according to a third preferred embodiment will be described. This correction circuit is similar to that of FIG. 4 according to the first embodiment. The signal conversion circuit 32 includes a correction circuit 33 employing a fixed table memory 80, a D/A converter 34 for D/A-converting the digital data of the correction circuit 33 into an analog value, a D/A converter 35 for D/A-converting the vertical address data from the vertical address signal generator 16 into a corresponding vertical address analog value, and an adder 36 for summing these corrected value of the correction circuit 33 and vertical address analog value.

According to the third embodiment, the conversion into the non-linear signal can be performed by summing the correction signal having an amplitude corresponding to the deviation amount to the input drive signal for the galvanometer 12 in the signal conversion circuit 32.

According to the third embodiment, the correction values corresponding to the deviation amounts are stored in the table memory 80 for each vertical address, into which a predetermined vertical address signal is supplied. Then the correction values are read out from the table memory 80 for each predetermined vertical address signal and thereafter the readout correction values are digital-to-analog converted in the D/A converter 34 to analog correction signals. On the other hand, the predetermined vertical address signal is directly supplied to another D/A converter 35 so as to produce the input drive signal whose slope changes linearly. Then the input drive signal and the above correction signal are added in the adder 36 so as to derive the desirable non-linear signal.

FIGS. 9A to 9C show output values for the vertical addresses at the circuit points A, B and C shown in FIG. 8. FIG. 9A shows the output values of the D/A converter 35 with respect to the vertical address and implies that the drive input value is changed in a predetermined linear mode with respect to the movement of the galvanometer 12. FIG. 9B shows the output values of the D/A converter 34 that are derived from the correction circuit 33. The output values represent correction values for the output values of FIG. 9A. FIG. 9C shows the values determined by summing those of FIG. 9A as well as FIG. 9B, and the summed values correspond to the output of FIG. 3C. As compared with the above first embodiment, the third embodiment employs two sets of D/A converters, in which a predetermined variation with respect to the vertical address is output from the D/A converter 35 and a correction amount for the non-linear characteristic is derived from the remaining D/A converter 34. Consequently, since the input/output characteristics of the D/A converter 34 are not critical, a highly precise correction can be realized even if the low-cost D/A converter is employed.

Figure 10:
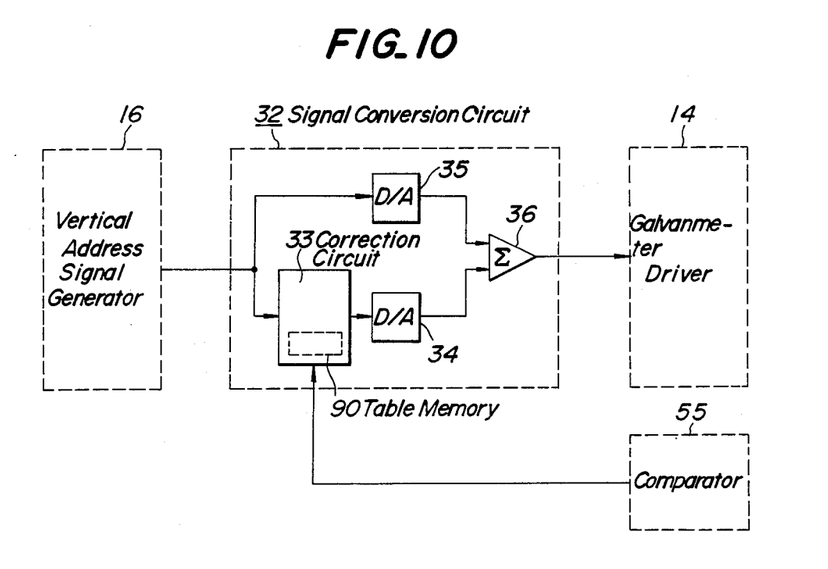
FIG. 10 is a block diagram of a signal conversion circuit according to a fourth embodiment.

Furthermore, referring to FIG. 10, a fourth embodiment will be described. Since the fourth embodiment has some relationship with the second embodiment, the signal conversion circuit 32 of FIG. 6 can be substituted by the signal conversion circuit 32 of FIG. 10. As easily understood from the circuit of FIG. 10 employing a RAM as the table memory 90, the scanning speed can be precisely corrected even if the deviation for each of the vertical addresses changes due to the aging effects of the galvanometer 12. Moreover, as one D/A converter derives the constant variations and the other D/A converter derives the correction value for the non-linear characteristics, the input/output characteristics of the latter D/A converter are not so critical, and a precise correction can be performed.

As has previously been described, the amounts of the deviation on the scanning speed of the galvanometer from a predetermined scanning speed can be corrected by adjusting the linearity of the galvanometer drive signal to obtain a desirable non-linear drive signal in the signal correction circuit according to the invention.

While the present invention has been described using a specific embodiment, it should be understood that further modifications and changes can be made without departing the scope of the present invention.

In the second embodiment as shown in FIG. 6, the timing circuit 56 may be omitted and the entire synchronization for the mark signal generator 52, mark signal counter 53 and the reference value setter 54 can be achieved by supplying the clock signals of the clock signal generator 23 thereto.

The updating operation of the table data in the second and fourth embodiments need not be performed every every one of the optical marks, but in a sampling period. Moreover, if such updating operations are required more often than in the above case, the table data can be updated at twice the period of the above case by counting the number of the horizontal lines scanning the no mark region. In other words, when the pulse signals from the timing circuit 55 as shown in FIG. 6 are supplied, the number of the signals representing no supply of the mark signals from the mark signal generator 52 may be counted in the mark signal counter 53.

In the second embodiment, only the data on the table memory corresponding to the vertical address which has been supplied from the vertical address signal generator 16, was corrected based upon the calculated value of the comparator 55. Various modifications can be utilized. For instance, the front data and rear data of the vertical address with respect to the variation point "D" of FIG. 9B are wholly corrected, or the n numbers of the calculation values and the present calculation value are averaged to obtain an averaged calculation value, so that the table data of the correction circuit 30 may be updated by newly employing the averaged calculation value.

Further, the calculation equation of the comparator 55 and the updating formula of the variable table memories in the correction circuits 30 and 33 may be obtained by utilizing the sampling control theory in a central processing unit.

As the shape and forming pitch of the optical mark 43 are freely determined, the optical marks may be formed at one pitch per one raster, or 100 rasters.

Although the optical mark 43 was formed on the form slide film because the form slide film 20A was used in the previous embodiments, such an optical mark may be independently formed in case of the soft format system in which no slide film exists, i.e., the recording frame is obtained from the computer outputs, or in case that only the print data supplied from the computer is recorded and thus no slide film is essentially required.

Furthermore, laser-COM was employed in the previous embodiments, the invention may be obviously utilized in a recording/reading apparatus in which the galvanometer is used to record or read the various information. For instance, a laser printer as a copying machine, a laser facsimile, or a laser display in which the constant scanning speed of the galvanometer are required.

What is claimed is:

1. An apparatus for correcting deviation from a constant scanning speed of a galvanometer driven by a linear drive signal, comprising:

memory means for storing correction data for zeroing the deviation from a constant scanning speed, means for reading out the correction data in response to an input address signal;

first digital-to-analog converting means for converting the correction data into an analog correction signal;

second digital-to-analog converting means for converting the input address signal into the linear drive signal; and adder means for summing the linear drive signal and the analog correction signal to derive a non-linear drive signal for the galvanometer which reduces the deviation to zero.

2. An apparatus as claimed in claim 1 wherein the memory means is a read only memory.

3. An apparatus as claimed in claim 1 further comprising;

reference data generating means for generating reference data indicative of any difference between the actual scanning speed and the constant scanning speed, and means for updating the correction data stored in the memory means in accordance with the reference data.

4. An apparatus as claimed in claim 3 wherein the memory means is a random access memory.

5. An apparatus as claimed in claim 3 wherein the memory means is an EPROM.

6. An apparatus for correcting deviation from a constant scanning speed of a galvanometer driven by a linear drive signal, comprising:

memory means for storing correction data for a linear drive signal;

means for reading out the stored correction data in response to an input address signal;

digital-to-analog converting means for converting the correction data into an analog non-linear drive signal which reduces the speed deviation to zero;

reference data generating means for generating reference data indicative of any differences between an actual scanning speed of the galvanometer and the constant scanning speed; and means for updating the correction data stored in the memory means in accordance with the reference data;

wherein the reference data generating means includes an optical mark signal generator, an optical mark signal counter responsive to the output of said optical mark signal generator, a reference value setter for setting a reference value and a comparator for comparing the output of said optical mark signal counter with said reference value.

7. An apparatus for correcting deviation from a constant scanning speed of a galvanometer driven by a linear drive signal, comprising:

random access memory means for storing correction data for a linear drive signal;

means for reading out the stored correction data in response to an input address signal;

digital-to-analog converting means for converting the correction data into an analog non-linear drive signal which reduces the speed deviation to zero;

reference data generating means for generating reference data indicative of any difference between an actual scanning speed of the galvanometer and the constant scanning speed,; and means for updating the correction data stored in the memory means in accordance with the reference data.

* * * * *